United States Patent
Yamazaki et al.

[11] Patent Number: 6,035,520
[45] Date of Patent: Mar. 14, 2000

[54] APPARATUS FOR MANUFACTURING LENS-FITTED PHOTO FILM UNIT

[75] Inventors: Takeshi Yamazaki; Syunji Kumamoto; Fumio Yuito, all of Kanagawa, Japan

[73] Assignee: Fuji Photo Film Co., Ltd., Kanagawa, Japan

[21] Appl. No.: 09/069,116

[22] Filed: Apr. 29, 1998

[30] Foreign Application Priority Data

May 1, 1997 [JP] Japan ..................................... 9-113697

[51] Int. Cl.⁷ ............................ B23Q 15/00; B23P 19/00
[52] U.S. Cl. ................................ 29/712; 29/714; 29/806; 53/118; 242/534
[58] Field of Search .................... 29/430, 806, 407.04, 29/407.05, 407.1, 712, 714; 53/118; 242/532.7, 634

[56] References Cited

U.S. PATENT DOCUMENTS

| | | |
|---|---|---|
| 3,457,627 | 7/1969 | Napor et al. . |
| 3,802,051 | 4/1974 | Andler et al. . |
| 3,930,296 | 1/1976 | Hoover . |
| 4,080,711 | 3/1978 | Kawada et al. . |
| 4,100,667 | 7/1978 | Napor et al. . |
| 4,673,272 | 6/1987 | Suzuki et al. . |
| 4,925,119 | 5/1990 | Shimizu et al. . |
| 4,965,931 | 10/1990 | Suzuki et al. . |
| 4,972,649 | 11/1990 | Mochida et al. . |
| 4,994,851 | 2/1991 | Iwai . |
| 5,311,231 | 5/1994 | Suzuki et al. . |
| 5,321,455 | 6/1994 | Cocca . |
| 5,483,317 | 1/1996 | Tanibata . |
| 5,610,679 | 3/1997 | Sugano et al. . |
| 5,630,178 | 5/1997 | Zander et al. . |
| 5,645,240 | 7/1997 | Signoretto . |
| 5,659,802 | 8/1997 | Watkins et al. . |
| 5,689,876 | 11/1997 | Suzuki et al. ............................. 29/722 |
| 5,732,299 | 3/1998 | Yoshizawa et al. . |
| 5,745,797 | 4/1998 | Watkins et al. . |
| 5,826,816 | 10/1998 | Yamaguchi . |
| 5,868,340 | 2/1999 | Araki et al. . |

FOREIGN PATENT DOCUMENTS

| | | | |
|---|---|---|---|
| 55-98049 | 7/1980 | Japan | ..................................... 242/534 |
| 7-219156 | 8/1995 | Japan | ............................. G03C 3/00 |
| 1459-755 | 2/1989 | U.S.S.R. | ............................. 242/534 |

*Primary Examiner*—David P. Bryant
*Attorney, Agent, or Firm*—Sughrue, Mion, Zinn, Macpeak & Seas, PLLC

[57] ABSTRACT

To manufacture a film unit, a filmstrip is advanced out of a cartridge shell by rotating a spool of the cartridge shell through a spool drive shaft. The spool drive shaft stops when the filmstrip is advanced a predetermined length out of the cartridge shell. A rotational position of the spool at the stop of the spool drive shaft is detected based on a rotational position of the spool drive shaft. The cartridge shell is disengaged from the spool drive shaft while the rotational position of the spool and the advanced length of the filmstrip are maintained unchanged. The spool of the cartridge shell is engaged with a film supply shaft, after adjusting a rotational position of the film supply shaft to the rotational position of the spool, while the leading end of the filmstrip is secured to a winding shaft. The filmstrip is wound into a roll by rotating the winding shaft.

6 Claims, 14 Drawing Sheets it is difficult to advance the filmstrip out of the cartridge shell. Therefore, it is important to position the leading end of the filmstrip within the slit of the winding shaft.

APPARATUS FOR MANUFACTURING LENS-FITTED PHOTO FILM UNIT

BACKGROUND OF THE INVENTION

1. Field of the Invention

The present invention relates to a method of manufacturing lens-fitted photo film units and an apparatus therefor. In particular, the present invention relates to a method of making a film roll from a filmstrip that is withdrawn from a cartridge shell, and loading the film roll and the cartridge shell in a film roll chamber and a cartridge chamber of the lens-fitted photo film unit, and an apparatus therefor.

2. Background Arts

Lens-fitted photo film units, hereinafter referred to as film units, contain a film cartridge and have a simple exposure mechanism for taking photographs on a filmstrip of the film cartridge. The filmstrip is previously withdrawn from a cartridge shell and wound into a roll. The film roll and the cartridge shell are loaded in a film roll chamber and a cartridge chamber of the film unit respectively.

Japanese Laid-open Patent Application No. 7-219156 discloses a method of loading a film unit with a new type of film cartridge that contains a filmstrip fully inside a cartridge shell, and can advance the filmstrip to the outside of the cartridge shell in response to a spool being rotated in an unwinding direction. Hereinafter, this new type of film cartridge will be called a leader-advancing type film cartridge. The film loading method according to this prior art is comprised of a first process of advancing the filmstrip a predetermined length out of the cartridge shell by rotating the spool, a second process of winding the filmstrip into a roll by engaging a leading end of the filmstrip with a winding shaft and rotating the winding shaft, a third process of putting the film roll and the cartridge shell in the film roll chamber and the cartridge chamber respectively, and a fourth process of pulling the winding shaft out of the film roll after the rear cover is attached.

The first to fourth processes are carried out in the same place while holding the cartridge shell by the same device. Concretely, a film supply shaft and a winding shaft are placed at a distance that is adjusted to the spacing between the film roll chamber and the cartridge chamber, and the spool of the cartridge shell is engaged with the film supply shaft. By rotating the film supply shaft and hence the spool in the unwinding direction, the filmstrip is advanced out of the cartridge shell. After the leading end of the filmstrip is secured to the winding shaft, the winding shaft starts rotating to wind the filmstrip into a roll, whereas the film supply shaft gets idle. The film roll and the cartridge shell are put in the film roll chamber and the cartridge chamber of the film unit by moving the winding shaft and the film supply shaft while maintaining the spacing between the winding shaft and the film supply shaft.

To secure the leading end to the winding shaft, the leading end of the filmstrip is inserted in a slit of the winding shaft and, thereafter, wound around the winding shaft by rotating the winding shaft. If the leading end of the filmstrip protrudes from the slit, the leading end is bent as the filmstrip is wound tightly around the winding shaft. Since the filmstrip is designed to be fully rewound back into the cartridge shell in the film unit after the completion of exposure of all available frames, it is necessary to advance the exposed filmstrip out of the cartridge shell for development and printing. However, if the leading end of the filmstrip is bent, it is difficult to advance the filmstrip out of the cartridge shell. Therefore, it is important to position the leading end of the filmstrip within the slit of the winding shaft.

To advance the filmstrip by a predetermined length out of the cartridge shell, it is possible to detect the leading end of the filmstrip by a photo sensor. However, since the film leader advancing process and the film winding process are carried out in the same place, the photo sensor must be placed before or behind the winding shaft in the film advancing direction. It is possible to provide a pair of sensors before and behind the winding shaft in the film advancing direction in order to confirm that the leading end of the filmstrip is positioned inside the slit of the winding shaft. In any case, however, the spool of the film cartridge should be rotated with accuracy after the detection of the leading end of the filmstrip by any of the photo sensors in order to stop the leading end inside the slit of the winding shaft. It is also time consuming. Besides, the length of the filmstrip out of the cartridge shell can change after the fine adjustment to the slit, as the filmstrip can uncoil inside the cartridge shell due to its own resiliency.

SUMMARY OF THE INVENTION

In view of the foregoing, an object of the present invention is to provide a method of manufacturing a film unit containing a leader advancing type film cartridge, by which it is possible to advance the filmstrip a predetermined length out of the cartridge with accuracy in a short time before winding the filmstrip into a roll. Another object of the present invention is to provide an apparatus for manufacturing a film unit according to the method.

The present invention is to provide a method and an apparatus of manufacturing a film unit, which achieve an efficient and accurate film prewinding and loading process.

To achieve the above object, a method of the present invention is comprised of the following steps:

advancing the filmstrip out of the cartridge shell by rotating the spool through a spool drive shaft;

stopping the spool drive shaft when the filmstrip is advanced a predetermined length out of the cartridge shell;

detecting a rotational position of the spool at the stop of the spool drive shaft based on a rotational position of the spool drive shaft;

disengaging the spool from the spool drive shaft while maintaining the rotational position of the spool and the advanced length of the filmstrip unchanged;

engaging the spool with a film supply shaft, after adjusting a rotational position of the film supply shaft to the rotational position of the spool;

securing the leading end of the filmstrip to a winding shaft when the spool is engaged with the film supply shaft;

withdrawing the filmstrip from the cartridge shell and winding the filmstrip into a roll by rotating the winding shaft; and loading the roll of the filmstrip and the cartridge shell in the film roll chamber and the cartridge chamber of the film unit respectively.

A film unit manufacturing apparatus of the present invention is comprised of:

a film leader advancing device having a spool drive shaft and a film leading end detection device for detecting the leading end of the filmstrip, the film leader advancing device advancing the filmstrip out of the cartridge shell by rotating the spool that is engaged with the spool drive shaft and stopping the spool drive shaft when the film leading end detection device detects the leading end of the filmstrip at a predetermined position out of the cartridge shell;

a rotational position detecting device for detecting a rotational position of the spool at the stop of the spool drive shaft based on a rotational position of the spool drive shaft;

a transferring device for holding the cartridge shell and the leading end of the filmstrip, disengaging the spool from the spool drive shaft, engaging the spool with a film supply shaft and securing the leading end of the filmstrip to a winding shaft, while maintaining the rotational position of the spool and the advanced length of the filmstrip unchanged;

an adjusting device for adjusting a rotational position of the film supply shaft to the rotational position of the spool before the spool is engaged with the film supply shaft, with reference to an output signal from the rotational position detecting device;

a winding device for withdrawing the filmstrip from the cartridge shell and winding the filmstrip into a roll by rotating the winding shaft; and a loading device for loading the roll of the filmstrip and the cartridge shell in the film roll chamber and the cartridge chamber of the film unit respectively.

Since the film advancing process are performed separately from the film winding process, it is unnecessary to provide a winding shaft in the film advancing process, so it is possible to place a film leading end detection device, such as a photo sensor, right at a position corresponding to the predetermined advanced length of the filmstrip out of the cartridge shell, where the leading end of the filmstrip will be positioned inside the slit of the winding shaft in the next film winding process.

According to a preferred embodiment, the method of the present invention further comprises the steps of setting a film winding wheel of the film unit in a predetermined rotational position, and adjusting a rotational position of the film supply shaft at the end of the film winding process to the predetermined rotational position of the film winding wheel.

Thereby, the spool of the cartridge shell is smoothly engaged with the film winding wheel in the loading process when the cartridge shell is loaded in the cartridge chamber.

BRIEF DESCRIPTION OF THE DRAWINGS

The above and other objects and advantages of the present invention will become apparent from the following detailed description of the preferred embodiments when read in connection with the accompanying drawings, which are given by way of illustration only and thus are not limitative of the present invention, wherein like reference numerals designate like or corresponding parts throughout the several views, and wherein.

DETAILED DESCRIPTION OF THE PREFERRED EMBODIMENT

Figure 1:
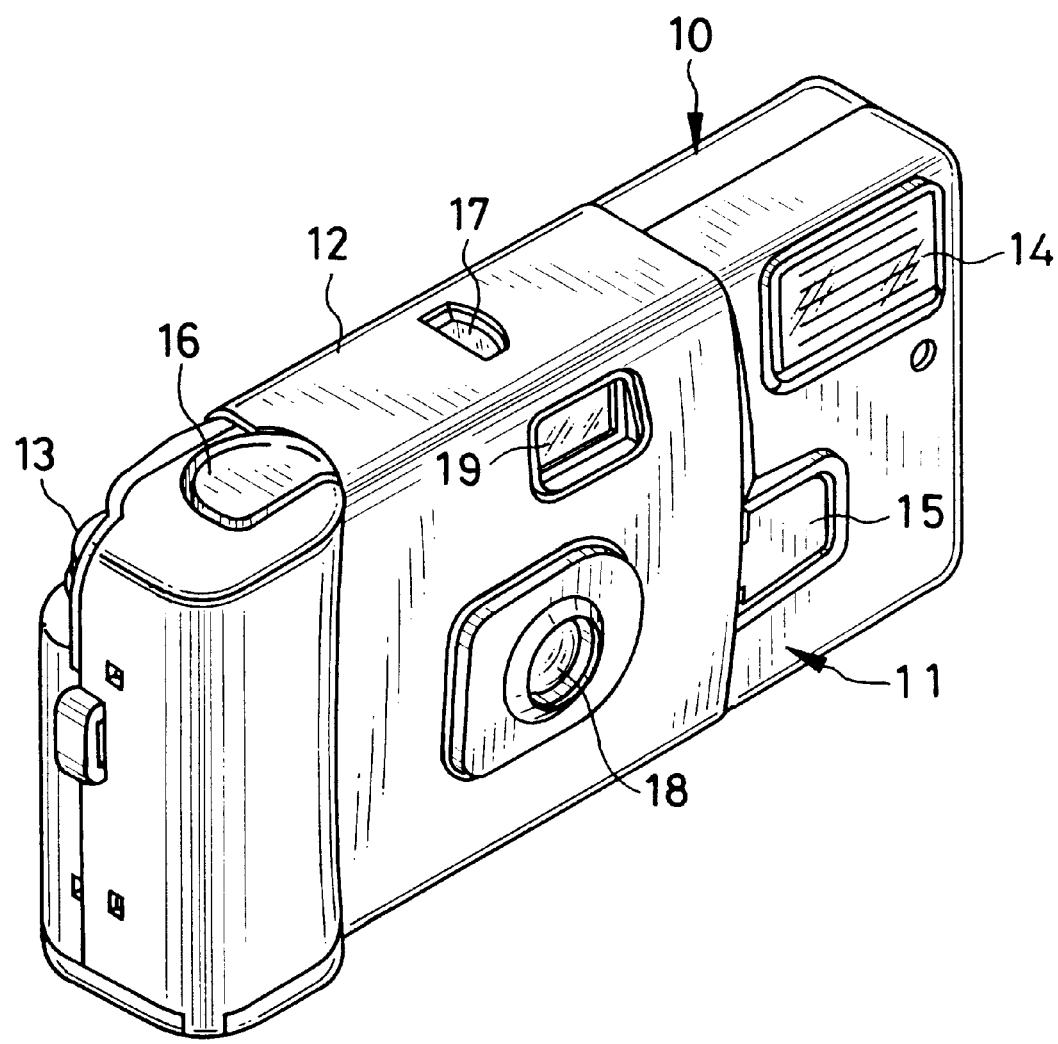
FIG. 1 is a perspective view of a film unit.

As shown in FIG. 1, a film unit 10 has a unit body 11 and a wrapping member 12 that partly wraps the unit body 11. The unit body 11 has a winding wheel 13, a flash window 14, a flash charge button 15, a shutter release button 16, a frame counter window 17, a taking lens 18 and a finder window 19. The wrapping member 12 has openings and cutouts for exposing the frame counter window 17, the taking lens 18 and the finder window 19 to the outside.

Figure 2:
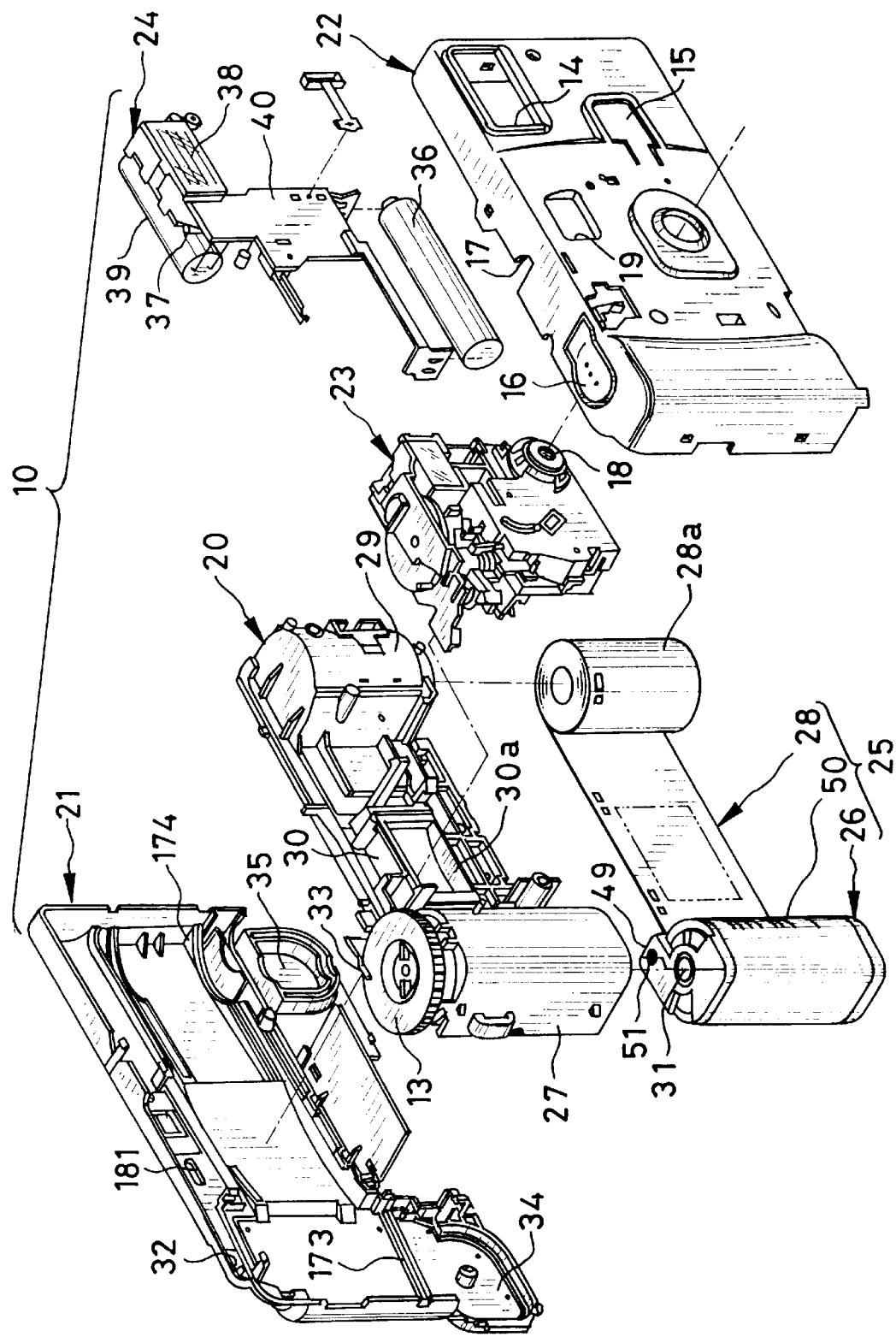
FIG. 2 is an exploded perspective view of a unit body of the film unit of FIG. 1.

As shown in FIG. 2, the unit body 11 is assembled from a basic portion 20, a rear cover 21, a front cover 22, an exposure unit 23, a flash unit 24, and a film cartridge 25. The basic portion 20 is an integral part having a cartridge chamber 27 and a film roll chamber 29 for holding a cartridge shell 26 of the film cartridge 25 and a roll 28a of photo filmstrip 28 respectively. The photo filmstrip 28 is withdrawn from the cartridge shell 26 and coiled into the roll 28a before the cartridge shell 26 and the film roll 28a are loaded in the chambers 27 and 29. After the loading of the film cartridge 25 in the basic portion 20, the rear cover 21, which is also an integral part, is attached to the back of the basic portion 20 through snap-in engagement, to close the chamber 27 and 29 light-tightly.

Figure 3:
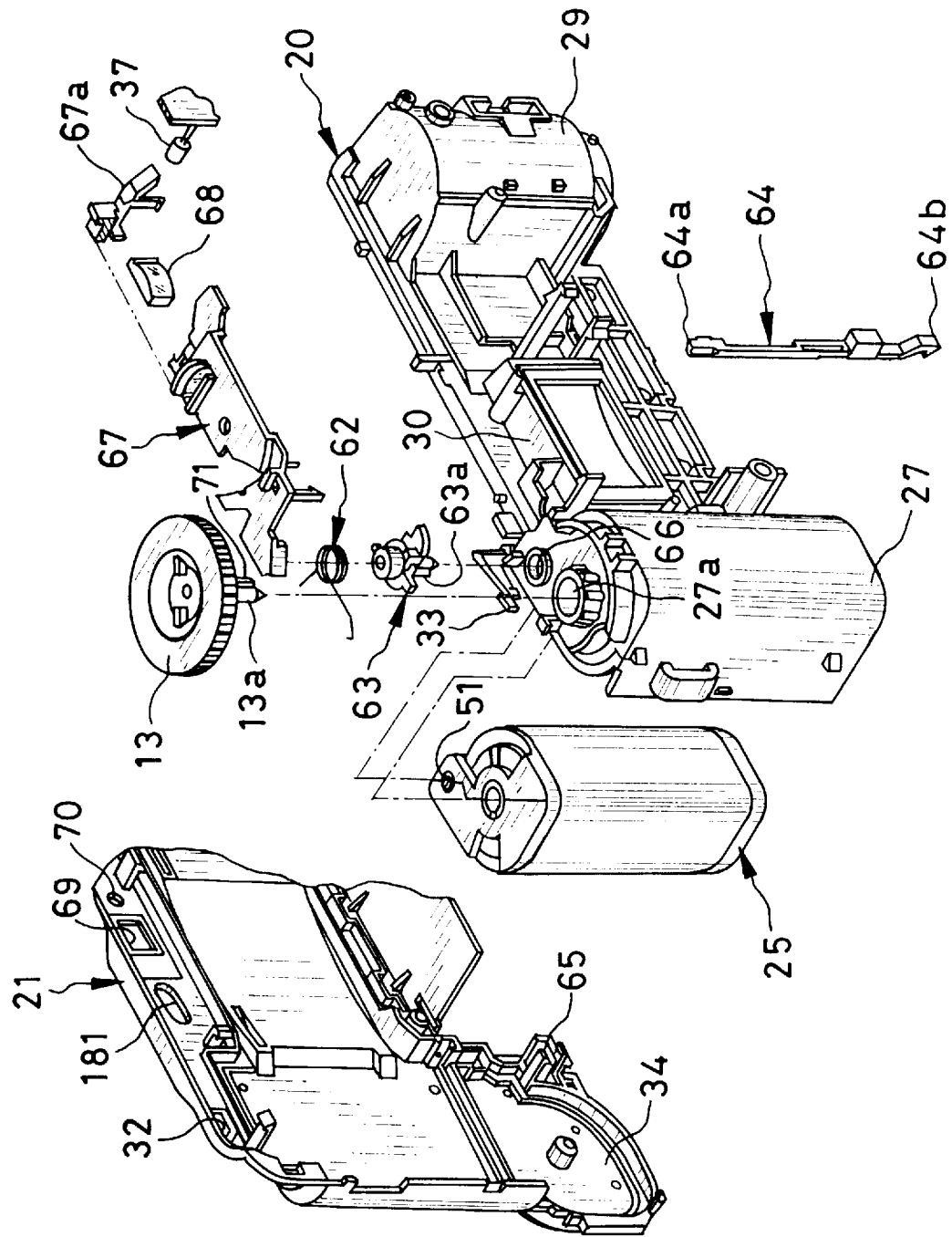
FIG. 3 is an exploded perspective view of a door closing member for closing a door member of the film cartridge in cooperation with a bottom lid of a cartridge chamber of the film unit being opened.

The film winding wheel 13 is mounted on a top wall of the cartridge chamber 27. As shown in FIG. 3, the film winding wheel 13 has an engaging key shaft 13a on the bottom, which protrudes into the cartridge chamber 27 through a hole 27a of the top wall, and engages with a spool 31 of the cartridge shell 26. Thus, the rotational movement of the film winding wheel 13 is transmitted to the spool 31. The film winding wheel 13 partly protrudes outside the unit body 11 through a slot 32 of the rear cover 21. By rotating the film winding wheel 13 in a winding direction, the filmstrip 28 is wound into the cartridge shell 26 one frame after each exposure. After the filmstrip 28 is fully exposed, the filmstrip 28 is wound up into the cartridge shell 26 by rotating the film winding wheel 13 in the winding direction.

A stop pawl 33 is formed integrally with the basic portion 20. The stop pawl 33 is engaged with an outer periphery of the film winding wheel 13, to provide a ratchet mechanism which allows the film winding wheel 13 to rotate in the winding direction but not in an unwinding direction.

There is no wall in the bottom sides of the cartridge chamber 27 and the film roll chamber 29, and bottom lids 34 and 35 for closing the bottom sides of the chambers 27 and 29 are formed integrally with the rear cover 21. An exposure chamber 30 is formed between the cartridge chamber 27 and the film roll chamber 29, and an exposure aperture 30a is formed through the exposure chamber 30. The exposure unit 23 is attached to the front of the exposure aperture 30a.

The flash unit 24 is attached to the front of the film roll chamber 29 through snap-in engagement. The flash unit 24 has an indication lamp 37, a light emitting portion 38, a main capacitor 39 and other elements necessary for flashing, which are mounted to a printed circuit board 40. The main capacitor 39 is charged with a battery 36 through a flash circuit of the printed circuit board 40 when the flash charge button 15 is pushed. When the main capacitor 39 is fully charged, the indication lamp 37 is turned on. Thereafter when the shutter release button 16 is depressed, the light emitting portion 38 emits light.

The front cover 22 is attached to the front of the basic portion 20 to cover the exposure unit 23 and the flash unit 24. The shutter release button 16 and the flash charge button 15 are formed integrally with the front cover 22. After the film cartridge 25 is loaded in the basic portion 20, and the rear and front covers 21 and 22 are attached to the basic portion 20, the bottom lids 34 and 35 are closed and fastened to the front cover 22 through snap-in engagement. The bottom lid 34 is opened when to remove the cartridge shell 26 that contains the fully exposed filmstrip 28.

Figure 4:
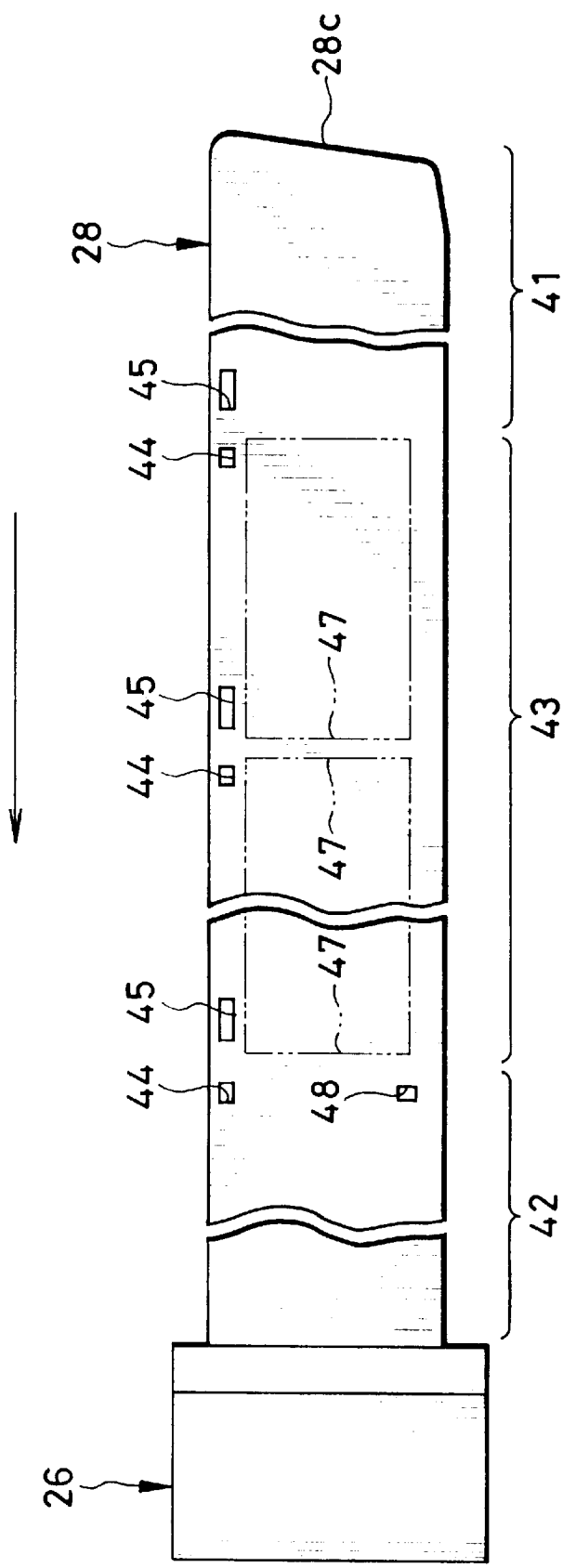
FIG. 4 is a schematic diagram of a film cartridge with its filmstrip withdrawn from its cartridge shell.

As shown in FIG. 4, the filmstrip 28 has a pair of shorter and longer perforations 44 and 45 per frame which are aligned along one side edge of the filmstrip 28 throughout its frame recording area 43 excluding a film leader 41 and a film trailer 42. The film trailer 42 is secured to the spool 31 of the cartridge shell 26. The perforations 44 and 45 are spaced from each other alternately by a shorter distance and a longer distance. Each frame 47 is recorded in an area of the longer distance between the perforations 44 and 45. A perforation 48 on the opposite side of the perforations 44 and 45 is provided to indicate the trailing end of the frame recording area 43.

Figure 5:
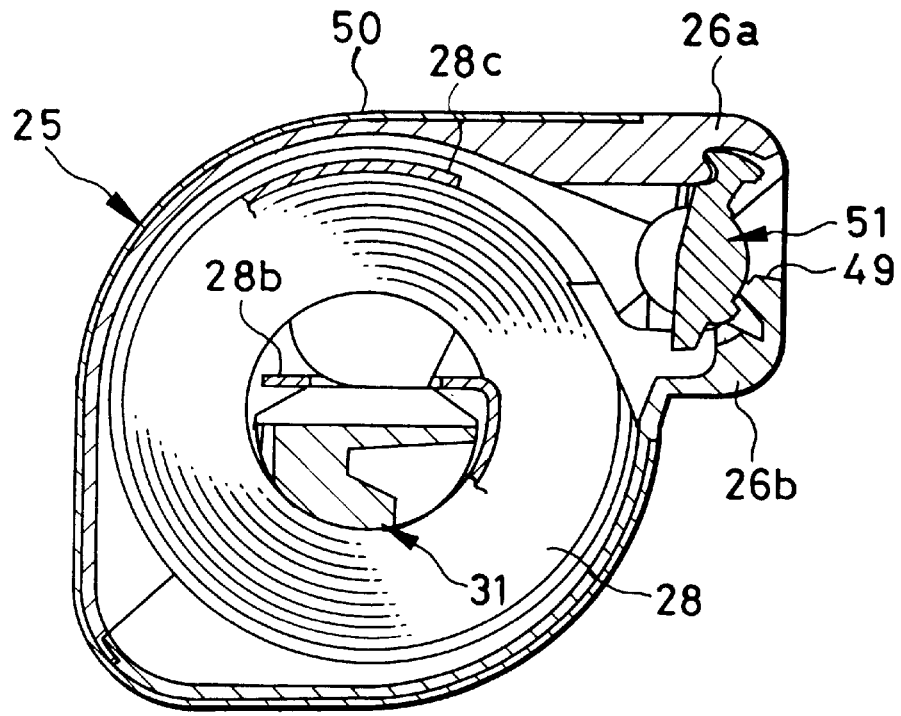
FIG. 5 is a sectional view of the film cartridge with its door member closed.
Figure 6:
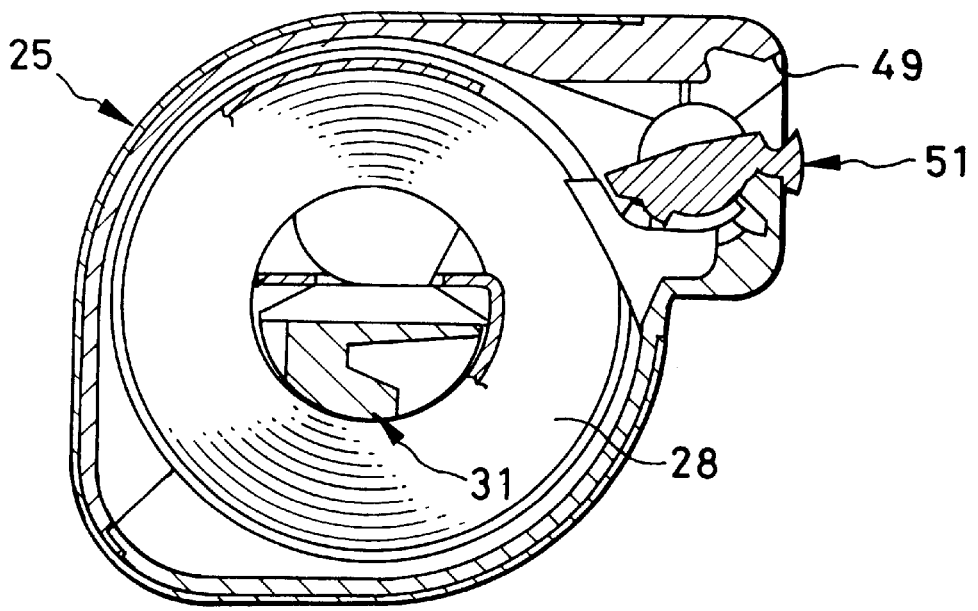
FIG. 6 is a sectional view of the film cartridge with its door member open.

As shown in FIG. 5, the cartridge shell 26 is constituted of plastic shell halves 26a and 26b, and the spool 31 is mounted rotatably therein. The cartridge shell 26 is a mechanism that makes it possible to advance the film leader 41 out of the cartridge shell 26 by rotating the spool 31 in the unwinding direction even where the filmstrip 28 is fully located inside the cartridge shell 26. Designated by 50 is a label indicating a film type, a film ID number and a bar code of the film type and the film ID number. A door member 51 is provided in a film port 49 to close the film port 49 in a light-tight fashion. The door member 51 is rotatable between a closing position to close the film port 49, as shown in FIG. 5, and an opening position to open the film port 49, as shown in FIG. 6.

Figure 7:
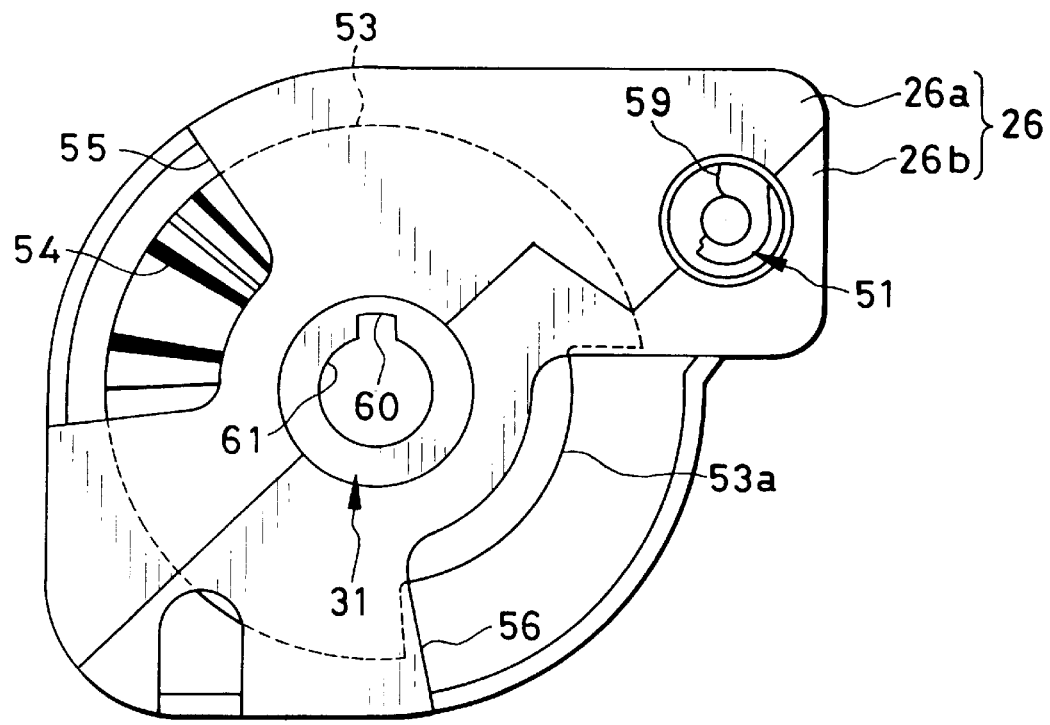
FIG. 7 is an end view of the film cartridge.

As shown in FIG. 7, a data disc 53 is secured to one end of the spool 31 so as to be rotatable about the spool 31. The data disc 53 has a radial bar code 54 thereon. The bar code 54 is readable through cutouts 55 and 56 which are formed through a face of the cartridge shell 26 of the cartridge shell 26, while the data disc 53 rotates with the spool 31. The data disc 53 has a smaller radius portion 53a of a limited angle. The angular position of the spool 31 is determined by the bar code 54 and the angular position of the smaller radius portion 53a.

Figure 8:
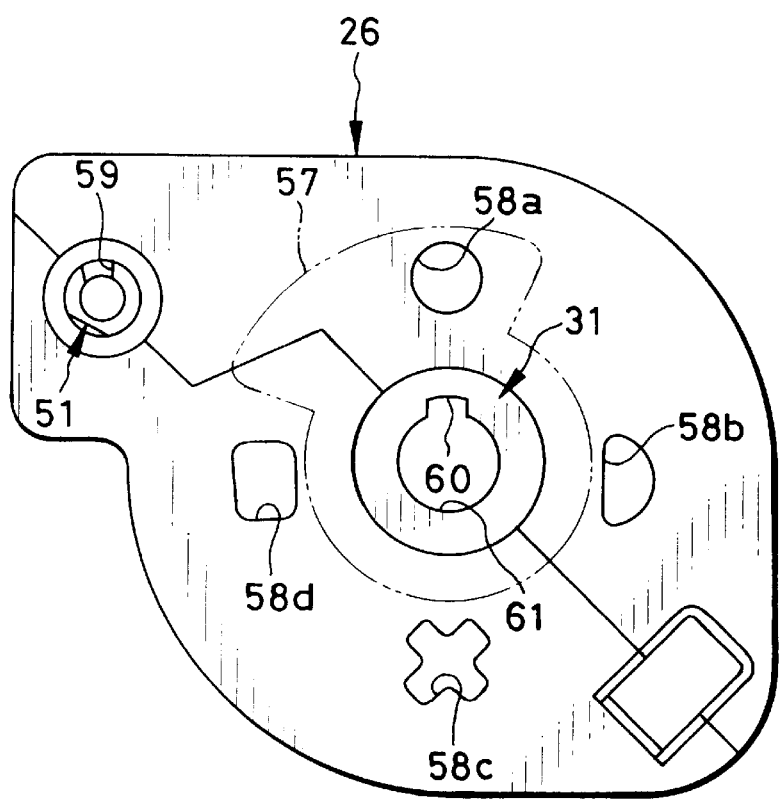
FIG. 8 is another end view of the film cartridge.

To the opposite end of the spool 31 is secured an indication disc 57 so as to be rotatable about the spool 31. As shown in FIG. 8, the indication disc 57 is visible through one of four windows 58a, 58b, 58c and 58d, which are formed through the opposite face of the cartridge shell 26, depending upon the condition of the contained filmstrip 28, i.e., unexposed, partly exposed, fully exposed, and developed, respectively.

As shown in FIGS. 7 and 8, opposite ends of the door member 51 are exposed to the outside of the cartridge shell 26, and a key groove 59 is formed in either end of the door member 51. Also the opposite ends of the spool 31 are exposed to the outside of the cartridge shell 26, and a key hole 61 having a key groove 60 is formed in either end of the spool 31. The key projection 71 of the engaging shaft 13a of the film winding wheel 13 is engaged in the key groove 60 of the spool 31.

As shown in FIG. 3, a door closing mechanism is provided in between the exposure chamber 30 and the cartridge chamber 27, for closing the door member 51 of the cartridge shell 26 in cooperation with the bottom lid 34 being opened. The door closing mechanism is constituted of a coiled spring 62, a drive member 63, an interconnection rod 64 and a hook 65 that is formed integrally with the bottom lid 34. The drive member 63 has a key projection 63a. The key projection 63a is engaged in the key groove 59 of the door member 51 through a hole 66 that is formed through the top wall of the cartridge chamber 27. The coiled spring 62 is suspended between the basic portion 20 and the drive member 63, to urge the drive member 63 to rotate in a direction to close the door member 51.

The interconnection rod 64 is mounted in between the cartridge chamber 27 and the exposure chamber 30, such that the interconnection rod 64 is movable vertically between an upper position and a lower position. A lower end 64b of the interconnection rod 64 is formed as a hook, and is engaged with the hook 65 of the bottom lid 34. Where the bottom lid 34 closes the cartridge chamber 27, the interconnection rod 64 is in the upper position. When the bottom lid 34 is opened, the interconnection rod 64 is pulled down to the lower position. In the upper position, an upper end 64a of the interconnection rod 64 protrudes into the course of the drive member 63, so the drive member 63 strikes against the upper end 64a at a predetermined rotational position where the door member 51 of the cartridge shell is fully open as shown in FIG. 6. That is, in the upper position of the interconnection rod 64, the upper end 64a stops the drive member 63 and the door member 51 in the opening position as shown in FIG. 6.

On the other hand, when the interconnection rod 64 moves to the lower position, the upper end 64a retracts from the course of the drive member 63, so the drive member 63 rotates according to the urging force of the coiled spring 62, thereby closing the door member 51. As the bottom lid 34 is further opened, the hook 65 is disengaged from the lower end 64b, leaving the interconnection rod 64 in the lower position.

The drive member 63 is pivotally held down by a top plate 67. The top plate 67 has a light guide 67a formed integrally therewith. The light guide 67a conducts light from the indication lamp 37 to a proximity of an eyepiece lens 68, so the light can be viewed from outside through a hole 70 that is formed beside a finder eyepiece window 69 through the rear cover 21.

Figure 9:
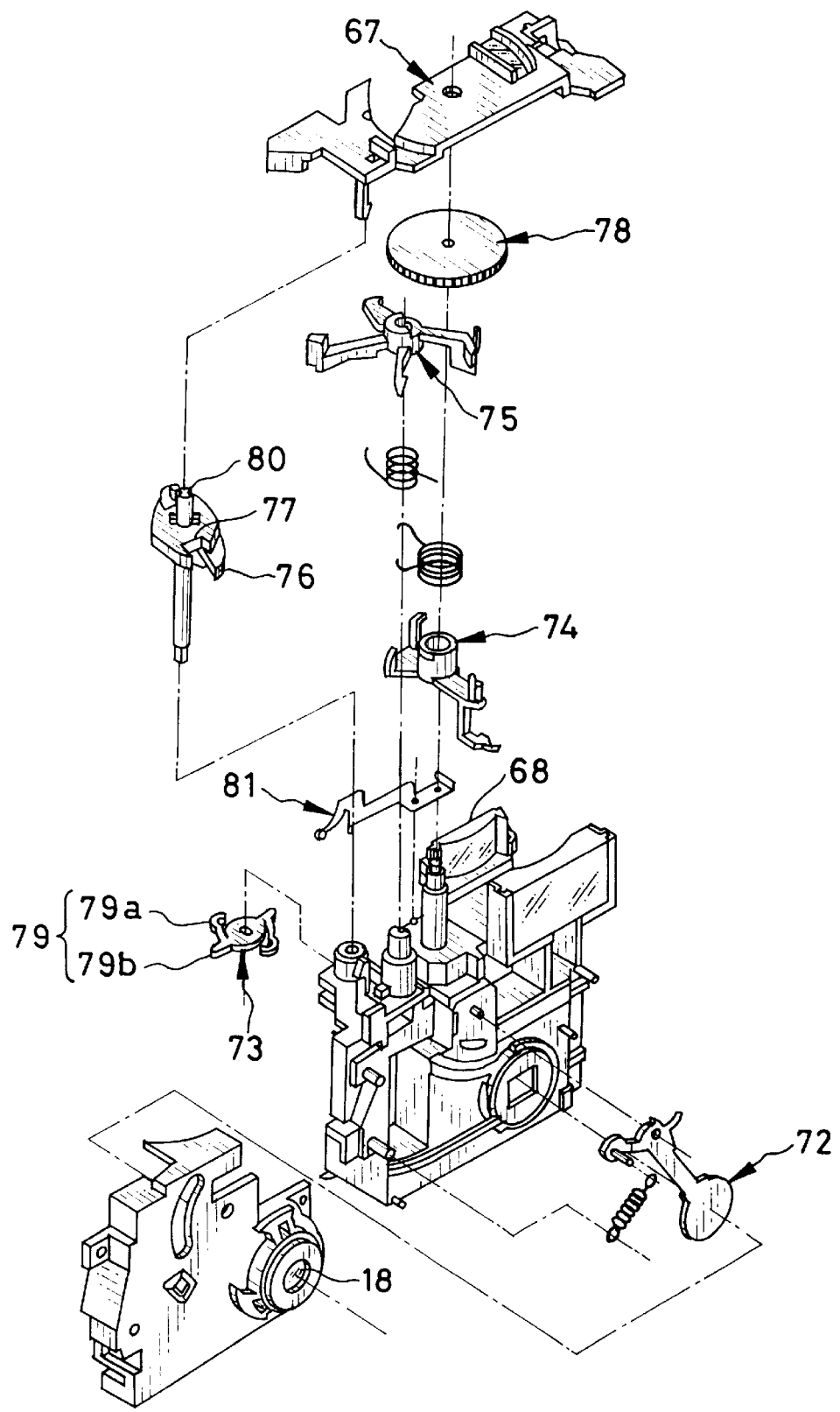
FIG. 9 is an exploded perspective view of an exposure unit of the film unit.

As shown in FIG. 9, the exposure unit 23 has the taking lens 18, a shutter blade 72, a sprocket 73, a shutter drive lever 74, a locking lever 75, a charging cam 76, a locking cam 77, and other mechanisms necessary for making an exposure through the taking lens 18. The sprocket 73 has two pairs of large and small teeth 79a and 79b, each pair 79 being symmetrical about a rotational center of the sprocket 73. The large teeth 79a are engageable in the long perforations 45 of the filmstrip 28, whereas the small teeth 79b are engageable in the short perforations 44. Circumferential distance between the two pairs 79 corresponds to the longer distance between the perforation 44 and 45, whereas circumferential distance between the large tooth 79a and the small tooth 79b of each pair corresponds to the shorter distance between the perforations 44 and 45.

As the filmstrip 28 is wound up into the cartridge shell 26 by rotating the film winding wheel 13, the sprocket 73 is engaged in the perforations 44 and 45, and rotates along with the movement of the filmstrip 28 in the winding direction that is shown by an arrow in FIG. 4. The rotation of the sprocket 73 is transmitted to the charging cam 76 and the locking cam 77. When the filmstrip 28 is wound up by one frame amount, the locking lever 75 comes into engagement with the locking cam 77, to lock the sprocket 73 and the film winding wheel 13. Meanwhile, the rotation of the charging cam 76 brings the shutter drive lever 74 to a charged position. Simultaneously, the rotational movement of the locking cam 77 and the charging cam 76 is transmitted to a frame counter disc 78 through a gear 80, causing the frame counter disc 78 to rotate by one unit.

A leaf spring 81 is for urging the charging cam 76 and the locking cam 77 and thus the sprocket 73 to rotate in the same direction as they are rotated by the movement of the filmstrip 28 in the winding direction. Thereby, the leaf spring 81 ensures that the teeth 79a and 79b of the sprocket 73 are engaged in the perforations 44 and 45 of the filmstrip 28 each time the filmstrip 28 moves by one frame.

Although the film unit 10 shown in the drawings has the flash unit 24, there are many film unit that have no flash unit. Those film units having no flash unit are correspondingly shorter in size than those having a flash unit. The size of the rear cover 21 also varies depending upon whether the film unit is of the flash built-in type or not.

Figure 10:
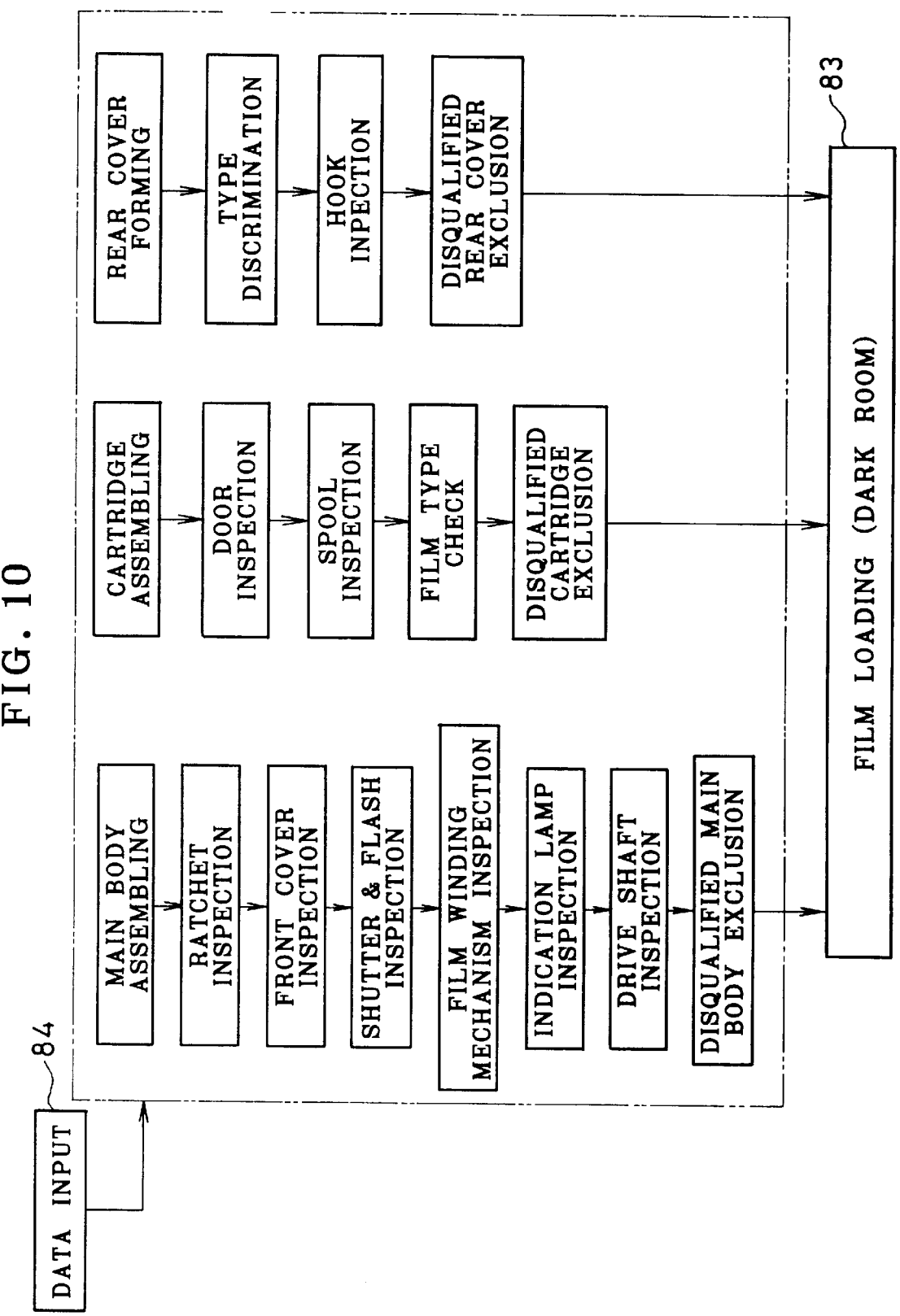
FIG. 10 is a flow chart illustrating those processes of manufacturing a film unit which are carried out before a film loading process in a dark room.

To manufacture the film unit 10 having the above described construction, the film winding wheel 13, the exposure unit 23, the flash unit 24, the battery 36 and the front cover 22 are attached to the basic portion 20 to assemble a main body. The film cartridge 25 is assembled from the shell halves 26a and 26b, the spool 31, the door member 51, the filmstrip 28 and other necessary parts. As shown in FIG. 10, the assembled main body, the assembled film cartridge 25 and the rear cover 21 are fed to a dark room 83, and are assembled into the unit body 11 by loading the film cartridge 25 in the basic portion 20 of the main body and then attaching the rear cover 21 to the main body.

The assembled main bodies are fed to a film loading process in the dark room 83 after going through several inspection processes. Specifically, the assembled main body is inspected for any malfunctions of the ratchet mechanism, the front cover 22, the flash unit 24, the shutter mechanism, the film winding mechanism, the indication lamp 37, and the drive member 63. Those main bodies which are disqualified through these inspection processes are ejected from the line to the dark room 83. A data input 84 is to enter data of film unit, including whether the film unit to manufacture is of the flash built-in type or not.

In the ratchet mechanism inspection process, a rubber roller is pressed onto the film winding wheel 13 to forcibly rotate the film winding wheel 13 in the unwinding direction, in order to confirm that the stop pawl 33 prevents the film winding wheel 13 from rotating in the unwinding direction. In the inspection process for the front cover, the contour of the main body is measured by a Laser displacement meter to check if the front cover 22 is tightly secured to the basic body 20.

In the flash and shutter inspection process, the shutter drive lever 74 is forcibly moved to the charged position by a jig that is inserted through a slot 181 formed through the rear cover 21, as shown in FIG. 3. Simultaneously, the flash charge button 15 is pushed to charge the flash unit 24. A photo receiving element is placed in front of the light emitting portion 38 of the flash unit 24 to check if the light emitting portion 38 projects light when the shutter release button 16 is depressed. A reflective photo sensor is placed in front of the taking lens 18, which projects light toward the shutter blade 72 through the taking lens 18, and receives light reflected from the shutter blade 72. Based on the received light, it is checked if the shutter blade 72 opens and closes in response to the shutter release operation. After checking the operations of the light emitting portion 38 and the shutter blade 72, the main capacitor 39 is discharged by short-circuiting.

Figure 11:
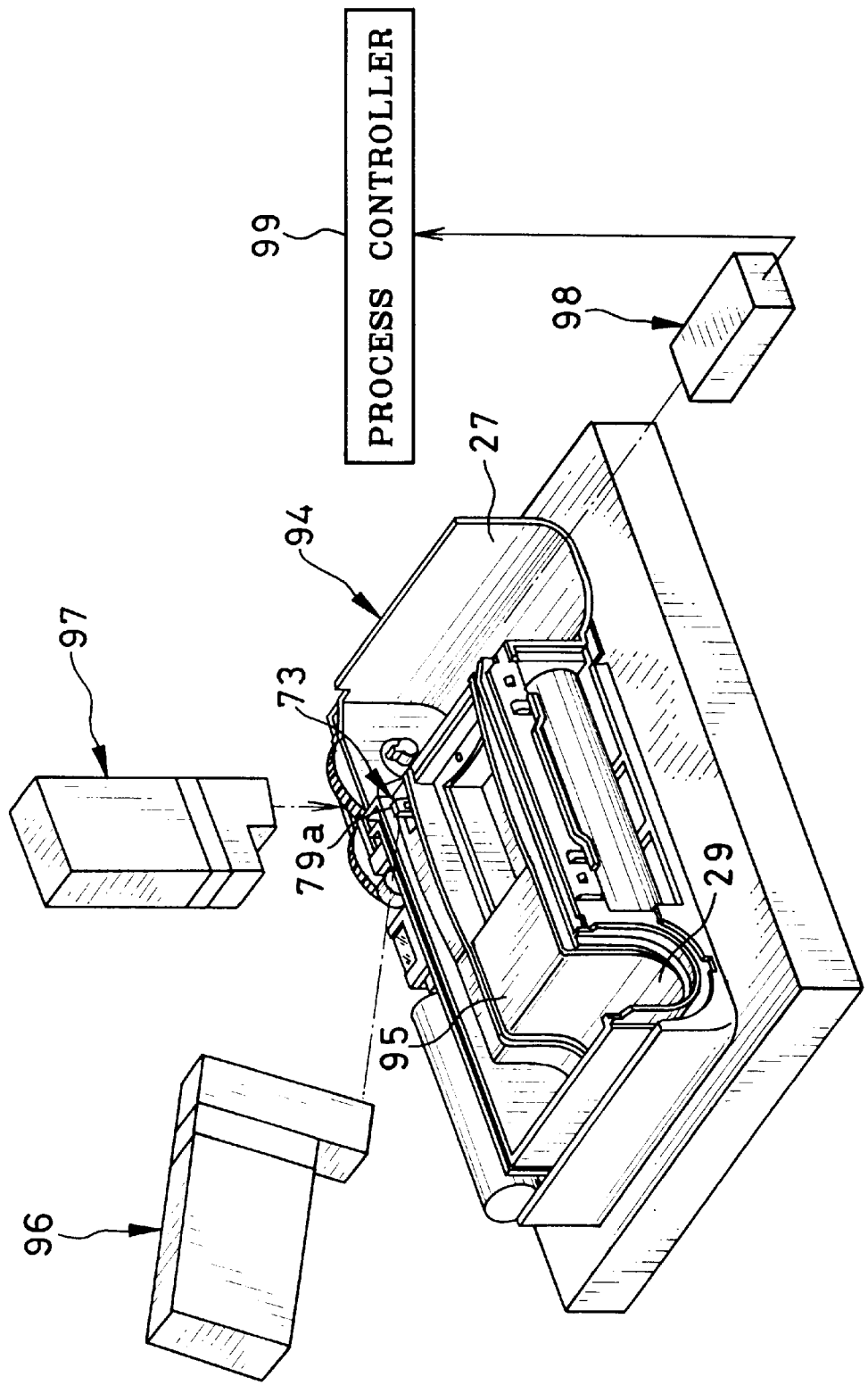
FIG. 11 is an explanatory diagram illustrating a film winding mechanism inspection process.

Thereafter, the main body is fed to the film winding mechanism inspection process, with its back side up, as shown in FIG. 11, wherein the main body is designated by 94. The large tooth 79a of the sprocket 73 protrudes out into a film passageway 95 of the main body 94. The film winding mechanism is designed to lock the sprocket 73 in this position. Since the film winding mechanism is unlocked by the shutter release operation in the shutter inspection process, a first solenoid 96 can push the protruding large tooth 79a to rotate into a position for catching the next perforation. Thereby, the small tooth 79b of the sprocket 73 comes to the film passageway 95.

Then, a second solenoid 97 pushes the small tooth 79b in the opposite direction to the film winding direction. Thereafter when the second solenoid 97 leaves the small tooth 79b, the small tooth 79b normally returns to the same position because of the force of the leaf spring 81. A process controller 99 monitors the rotational position of the sprocket 73 through an image sensor 98 to check if the small tooth 79b returns to the same position after being pushed by the second solenoid 97. If not, the main body 94 is disqualified.

Figure 12:
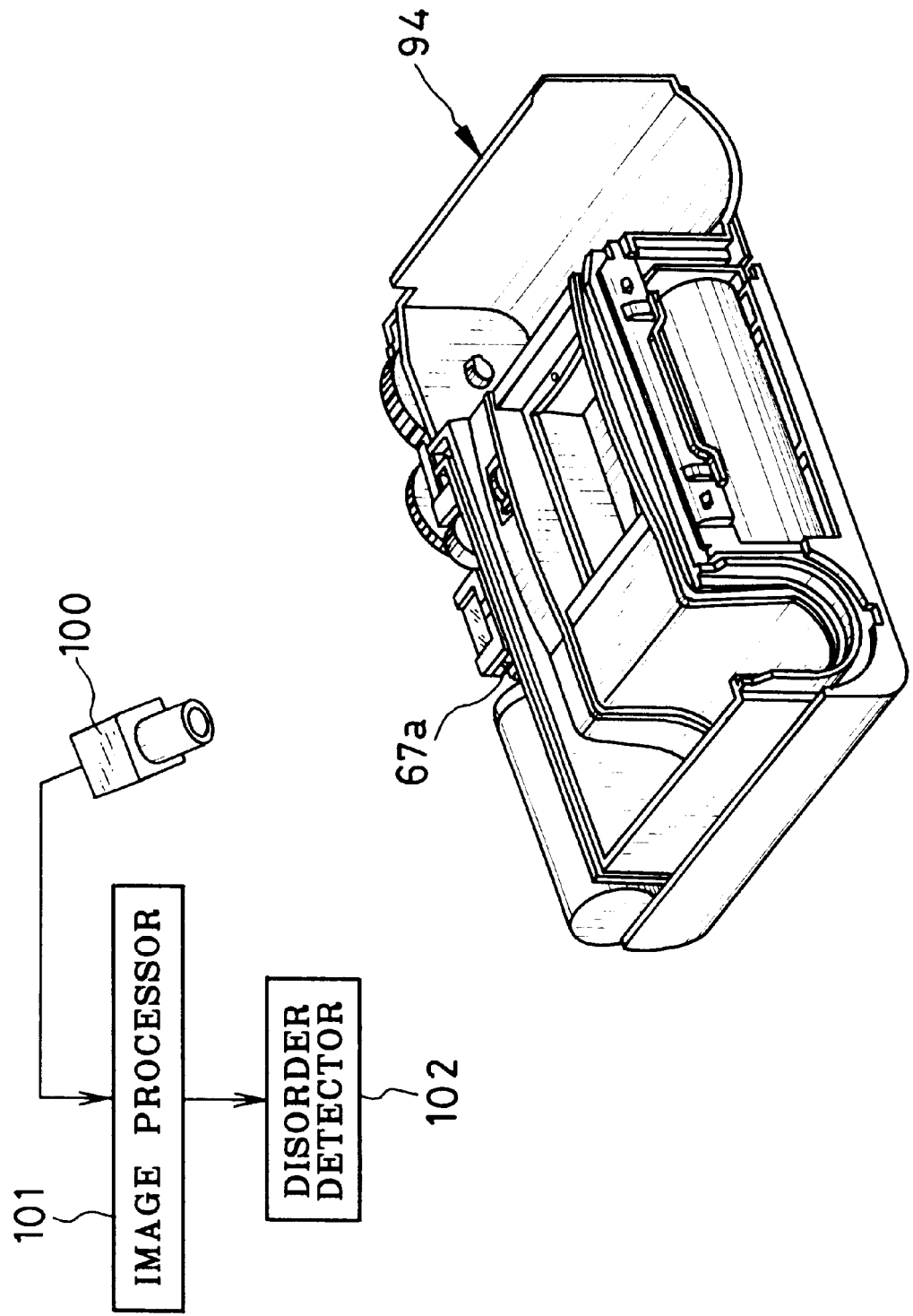
FIG. 12 is an explanatory diagram illustrating an indication lamp inspection process.

In the inspection process for the indication lamp 37, it is checked if the indication lamp 37 is off. Since the main capacitor 39 is discharged in the end of the shutter and flash inspection process, the indication lamp 37 should normally be turned off in this stage. As shown in FIG. 12, a video inspection apparatus consisting of a CCD camera 100, an image processor 101 and a disorder detector 102 is used for detecting whether the indication lamp 37 is on or off. The CCD camera 100 photographs the back side of the main body 94, and sends image data to the image processor 101. The image processor 101 compares brightness level of the image data to a reference brightness value, and sends the result to the disorder detector 102. The disorder detector 102 previously stores data for judgment. If the disorder detector 102 judges based on the result from the image processor 101 that the indication lamp 37 emits light continuously or intermittently, the main body 94 is disqualified. Needless to say, the indication lamp inspection is not carried out on those types of film unit which do not have a flash unit.

In the drive shaft inspection process, the angular position of the key projection 63a of the drive member 63 is detected by a Laser displacement meter, in order to check if the rotational position of the drive member 63 is corresponding to the closing position of the door member 51 of the cartridge shell 26 as shown in FIG. 5. If not, the main body 94 is disqualified. Thereby, the key projection 63a is engaged in the key groove 59 of the door member 61 without fail when the cartridge shell 26 is loaded in the main body 94 in the dark room 83.

Disqualification data about those main bodies 94 which are disqualified in the respective inspection process is sent to an exclusion process, so that the disqualified main bodies 94 are excluded immediately before being sent to the film loading process 83. The disqualification data is sent from the inspection processes to the exclusion process through a well-known data transmission device. For example, a photo switch is provided in each inspection process, whereas a shift register is provided in the exclusion process. The photo switches detect the main body 94 being fed in the individual inspection processes. The shift register shifts the disqualification data based on an output signal from the photo switch.

The film cartridges 25 also go through several inspection processes before being fed to the film loading process 83. First the door member 51 is inspected about whether the door member 51 is in the closing position or not. The position of the door member 51 is detected by a reflective photo sensor through the film port 49. If the door member 51 is not completely closed, the film cartridge 25 is disqualified.

Next the spool 31 is inspected about whether the rotational or angular position of the spool 31 is proper or not, by detecting the position of the indication disc 57 through a reflective photo sensor. If the indication disc 57 is not visible through the window 58a for indicating that the filmstrip 28 is unexposed, the film cartridge 25 is disqualified.

Thereafter, the film type of the film cartridge 25 is checked by reading the bar code on the label 50 through a bar code reader. If the film type represented by the bar code is not identical to the film type designated through the data input 84, the film cartridge 25 is excluded in the next exclusion process. In the exclusion process, those film cartridges 25 which are disqualified through the door inspection and the spool inspection are excluded, in the same way as in the exclusion process for the main bodies 94.

The rear covers 21 are formed from a plastic material, and the type of rear covers 21 which are fed to the dark room 83 are designated through the data input 84. Before being fed to the dark room 83, the rear covers 21 are discriminated between those for a film unit with flash and those for a film unit without flash, and are inspected for any disorder of the engaging hooks. Especially, the hook 65 of the bottom lid 34 is important for the closing and opening of the door member 51 of the film cartridge 25. Those rear covers 21 which are disqualified for some reasons are excluded immediately before being fed to the dark room 83, in the same way as the disqualified main bodies 94 and film cartridges 25.

The dark room 83 has three entrances respectively for the main body 94, the film cartridge 25 and for the rear cover 21, and an exit for exiting the unit body 11. The entrances and exit have a double-shutter structure for blocking light from entering as these parts are carried into the dark room 83. The double-shutter structure is disclosed in U.S. Pat. No. 5,689, 876.

Figure 13:
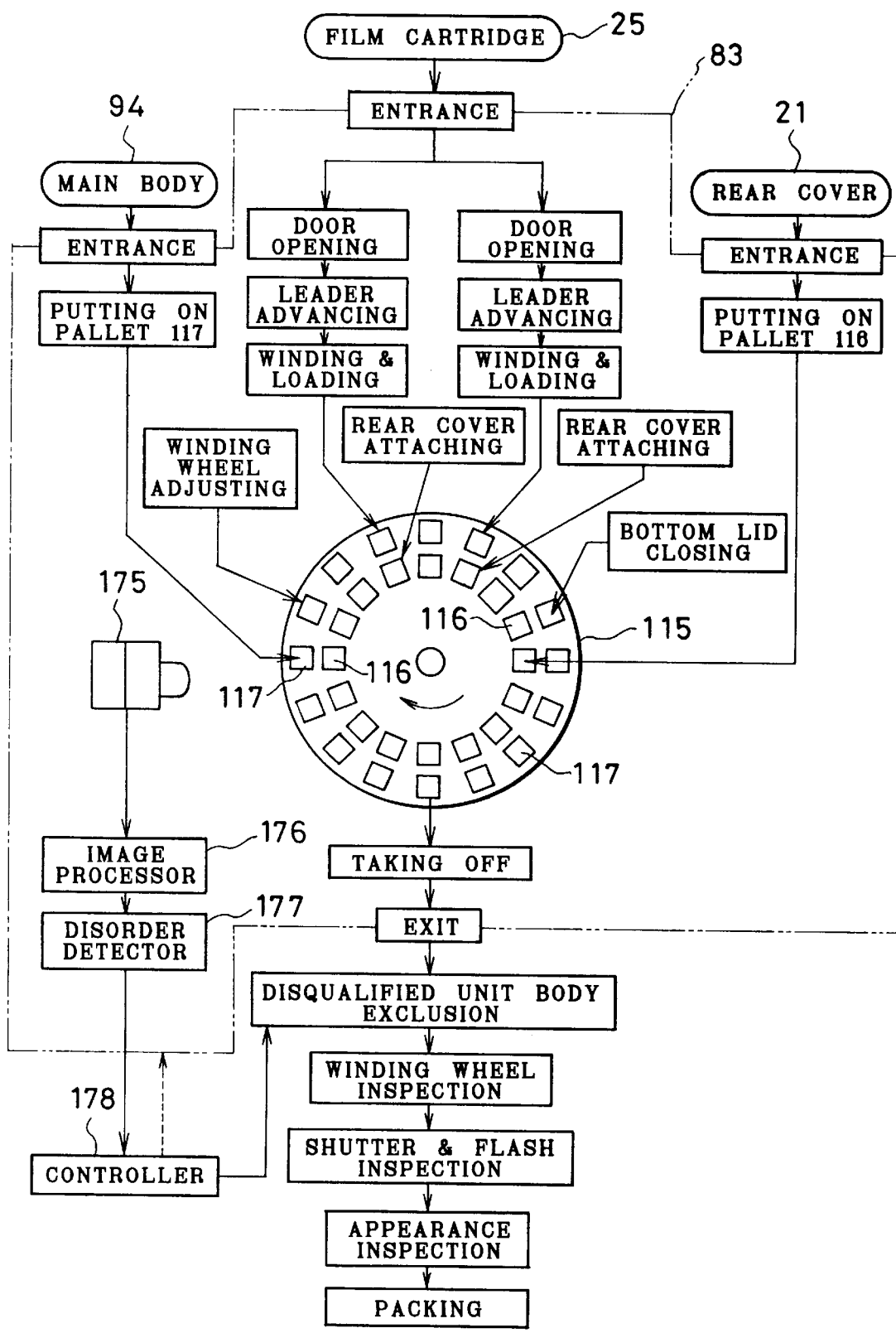
FIG. 13 is an explanatory diagram illustrating the film loading process and the following processes of manufacturing the film unit.

As shown in FIG. 13, the rear covers 21 are put into the dark room 83 one after another, and are put on pallets 116 on a turn table 115 one by one. The rear covers 21 on the pallets 116 are oriented in the same direction relative to the rotational center of the turn table 115, with their bottom lids 34 and 35 opened. The main bodies 94 are put into the dark room 83 one after another, and are put on pallets 117 on the turn table 115 one by one. The pallets 117 are disposed beside the pallets 116 for the rear covers 21 in one-to-one relationship. The main bodies 94 on the pallets 117 are oriented in the same direction relative to the rotational center of the turn table 115, with their bottom side up.

On the turn table 115, the main body 94 is first subjected to a winding wheel adjusting process, wherein the film winding wheel 13 is rotated by a rubber roller in the film winding direction, while a Laser displacement meter monitors the rotational position of the engaging shaft 13a, i.e., the angular position of the key projection 71. When the key projection 71 comes to a predetermined angular position, the rubber roller stops rotating the film winding wheel 13. In the predetermined angular position of the key projection 71, the engaging shaft 13a of the film winding wheel 13 fits in the key hole 61 of the spool 31 of the film cartridge 25.

The film cartridges 25 are put into the dark room 83 two pieces at a time, so the two film cartridges 25 are subjected to a door opening process, a leader advancing process, and a film winding and loading process in parallel with each other. In the door opening process, a jig is inserted in the key groove 59 of the door member 51, to open the door member 51. After the film port 49 is oriented in a predetermined direction in the door opening process, the film cartridge 25 is fed to the next leader advancing process.

Figure 14:
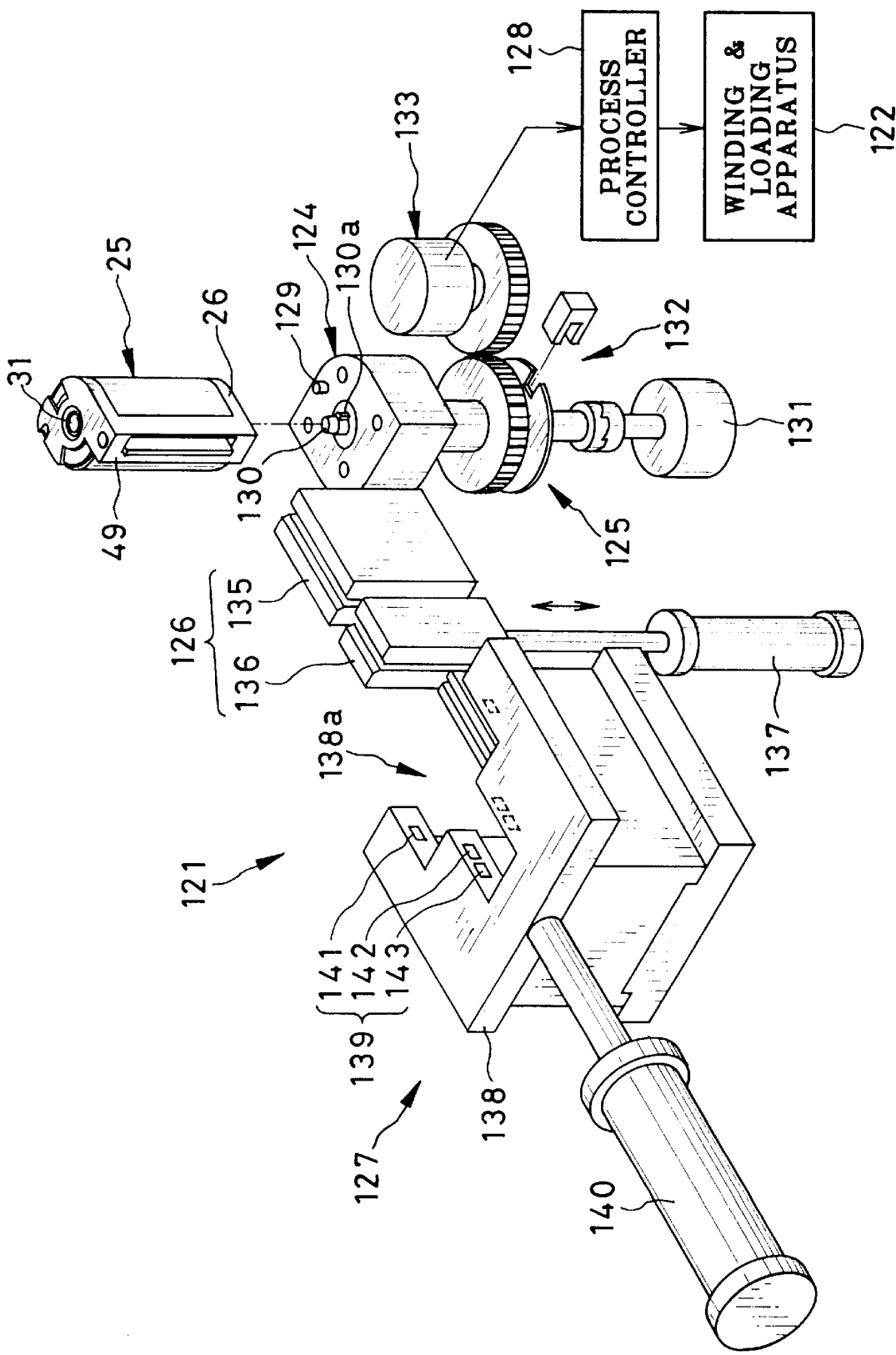
FIG. 14 is a perspective view of a film leader advancing device for advancing the filmstrip a predetermined length out of the cartridge shell.

The leader advancing process is carried out by a film leader advancing apparatus 121, as shown in FIG. 14. The film leader advancing apparatus 121 is constituted of a cartridge holder 124, a spool driver 125, a film guide 126, and a leading end detector 127. A process controller 128 is provided for controlling the film leader advancing apparatus 121. The film cartridge 25 is put on the cartridge holder 124 with its spool 31 oriented vertical. A cartridge sensor 129 is provided in the cartridge holder 124. When the cartridge sensor 129 detects the film cartridge 25, the cartridge holder 124 starts sucking, thereby to hold the film cartridge 25 securely thereon.

The spool driver 125 is constituted of a spool drive shaft 130 to be engaged with the spool 31, a motor 131 for rotating the spool drive shaft 130 and thus the spool 31, an initial position detector 132, a pulse encoder 133 for detecting rotational amount of the spool drive shaft 130 and other minor elements. The spool drive shaft 130 is oriented vertical, and its upper end protrudes upward from the cartridge holder 124. The upper end of the spool drive shaft 130 has a key projection 130a in the same way as the engaging shaft 13a of the film winding wheel 13. The initial position detector 132 is used for positioning the spool drive shaft 130 in an initial position where the key projection 130a of the spool drive shaft 130 is in a predetermined angular position that corresponds to the angular position of the spool 31 of the film cartridge 25 as shown in FIG. 8, indicating that the film cartridge 25 is unexposed.

The process controller 128 sets the spool drive shaft 130 in the initial position with reference to output signal from the initial position detector 132 before putting the film cartridge 25 on the cartridge holder 26. Thus, the key hole 61 of the spool 31 is fitted on the upper end of the spool drive shaft 130 without fail, and the film cartridge 25 is placed properly on the cartridge holder 124.

The film guide 126 consists of first and second guide members 135 and 136 for guiding the film leader 41 as being advanced out of the cartridge shell 26 by rotating the spool drive shaft 130. The guide member 135 near the cartridge holder 124 stays in alignment with a straight leader advancing path. The second guide member 136 farther from the cartridge holder 124 is movable between a guide position in alignment with the first guide member 135, as shown in FIG. 14, and a retracted position retracted from the leader advancing path. When the film cartridge 25 is to be loaded in a film unit with flash, the process controller 128 inserts the second guide member 136 in the leader advancing path by driving a cylinder 137. If not, the process controller 128 retracts the second guide member 136 from the leader advancing path.

The leading end detector 127 is constituted of a plate member 138 having an inlet 138a in one side opposed to the film guide 126, a photo sensor device 139 mounted in the inlet 138a opening for detecting the film leading end 28c, and a cylinder 140 for shifting the plate member 138 along the leader advancing path. The cylinder 140 is driven to move the plate member 138 toward the cartridge holder 124 when the film cartridge 25 on the cartridge holder 124 is to be loaded in a film unit with no flash. As described above, the second guide member 136 is removed from the leader advancing path at that time. On the contrary, when the film cartridge 25 on the cartridge holder 124 is to be loaded in a film unit with flash, the cylinder 140 is driven to move the plate member 138 backward from the cartridge holder 124, so the second guide member 136 can move back to the leader advancing path.

The photo sensor device 139 consists of three photo sensors 141, 142 and 143 which are arranged along the leader advancing path. The process controller 128 drives the motor 131 to rotate the spool drive shaft 130 first at a high speed. When the first photo sensor 141 detects that the film leader 41 of the filmstrip 28 comes in the inlet 138a of the plate member 138, the process controller 128 decelerates the motor 131. When the second photo sensor 142 detects the leading end 28c of the filmstrip 28, the process controller 128 deactivates the motor 131. Since the distance from the cartridge holder 124 to the plate member 138 and thus the second sensor 142 is changed according to whether the film cartridge 25 is to be loaded in a film unit with flash or with no flash, the advanced length of the film leader 41 from the cartridge shell 26 is correspondingly adjusted to the film unit type.

The process controller 128 counts encoder pulses from the pulse encoder 133 while the film leader 41 is advanced, and derives an angular position of the key groove 60 of the spool 31 from the count obtained at the stop of the motor 131. The derived angular position of the key groove 60 is used as rotational position data of the spool 31 for the next winding and loading process. If the third sensor 143 detects the leading end 28c, the process controller 128 determines that the motor 131 overruns. Then, the process controller 128 rewinds the filmstrip 28 back into the cartridge shell 26, and repeats the above described film advancing operation to advance the film leader 41 out of the cartridge shell 26 by a length predetermined according to the film unit type.

Figure 15:
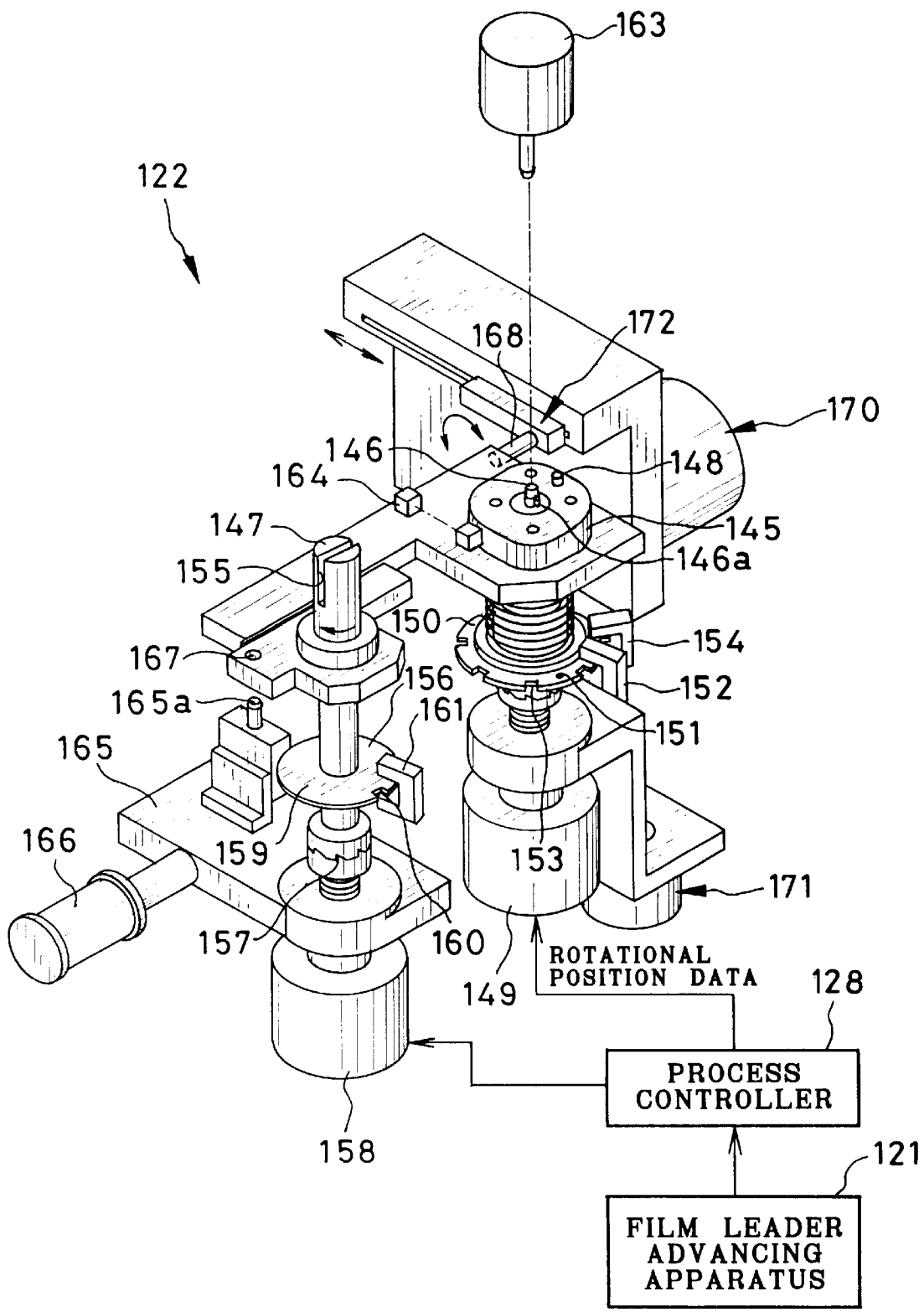
FIG. 15 is a perspective view of a film winding and loading device for winding the filmstrip into a roll and loading the film roll and the cartridge shell in the unit body.

The film cartridge 25 having the film leader 41 advanced by the predetermined length out of the cartridge shell 26 is fed to the winding and loading process, wherein the filmstrip 28 is wound into the roll 28a and the film roll 28a and the cartridge shell 26 are loaded in the film roll chamber 29 and the cartridge chamber 29 of the main body 94 respectively. The winding and loading process is performed by a film winding and loading apparatus 122, as shown in FIG. 15. The film winding and loading apparatus 122 includes a cartridge holder 145, a film unwinding shaft 146, and a winding shaft 147. The process controller 128 also controls the film winding and loading apparatus 122.

The film cartridge 25 is transferred from the leader advancing apparatus 121 to the film winding and loading apparatus 122 by use of a transfer machine. The transfer machine lifts the film leader 41 and the cartridge shell 26 together in an axial direction of the spool 31, and carries them to the winding and loading apparatus 122. The transfer machine holds the film leader 41 at a portion slightly before the leading end 28c of the filmstrip 28, so the leading end 28c can easily be inserted into a slit 155 of the winding shaft 147 of the film winding and loading apparatus 122.

A cartridge sensor 148 is provided in the cartridge holder 145. When the cartridge sensor 148 detects the film cartridge 25, the cartridge holder 145 starts sucking, thereby to hold the film cartridge 25 securely thereon. The film supply shaft 146 has a key projection 146a at its upper end that protrudes upward from the cartridge holder 145. The key projection 146a may fit in the key groove 60 of the key hole 61 of the spool 31.

The winding shaft 147 is spaced from the film supply shaft 146 a distance corresponding to the advanced length of the leader 41 out of the cartridge shell, so the leading end 28c of the filmstrip 28 is inserted in the slit 155 of the winding shaft 147 where the spool 31 of the cartridge shell 26 is fit on the film supply shaft 146. Before putting the cartridge shell 26 on the cartridge holder 145, the process controller 128 adjusts the angular position of the key projection 146a to the angular position of the key groove 60 of the spool 31 based on the rotational position data of the spool 31 obtained in the end of the film leader advancing process as a count of the encoder pulses.

For adjusting the angular position of the key projection 146a are used an initial position detector, a pulse encoder and an adjusting motor 149. The initial position detector is constituted of a disc 150 rotating together with the film supply shaft 146, a hole 151 formed through a circumferential portion of the disc 150, and a photo sensor 152 that detects the hole 151 when the film supply shaft 146 comes to the initial position. The pulse encoder is constituted of a plurality of radial notches 153 formed through the disc 150 at regular intervals, and a photo sensor 154 for detecting the notches 153 to determine rotational position of the disc 150. The adjusting motor 149 is a pulse motor, and is disconnected from the film supply shaft 146 after the angular position of the key projection 146a is adjusted.

The process controller 128 starts driving the motor 149 and counting encoder pulses from the pulse encoder of the winding and loading apparatus 122, and stops driving the motor 149 when the count of the encoder pulses reaches a value that corresponds to the rotational position data of the spool 31 that is detected in the preceding film advancing apparatus 121. Thus, the initial position of the film supply shaft 146 is adjusted to the rotational position of the spool 31 at the end of the film advancing process. Thereafter, the process controller 128 drives a transfer device to transfer the film cartridge 25 from the film advancing apparatus 121 to the winding and loading apparatus 122.

In the slit 155 of the winding shaft 147 is provided a clipping mechanism for clipping the film leader 41 that is inserted in the slit 155 from upward. The clipping mechanism has a claw that presses the film leader 41 onto an inner wall of the slit 155 according to a spring force, as is disclosed in FIG. 7 of U.S. Pat. No. 5,689,876. At that time, the leading end 28c does not protrude from the slit 155, because the advanced length of the film leader 41 out of the cartridge shell 26 is precisely controlled in the leader advancing process.

The winding shaft 147 is connected to an initial position detector 156, a joint member 157, and a motor 158. The initial position detector 156 is constituted of a disc 159 that rotates together with the winding shaft 147, a hole 160 formed through the disc 159, and a photo sensor 161 for detecting the hole 160. The initial position of the winding shaft 147 is where the photo sensor 161 detects the hole 160. The motor 158 rotates the winding shaft 147. The joint member 157 is for connecting the motor 158 to the winding shaft 147 and disconnecting the motor 158 from the wing shaft 147. Before the film cartridge 25 is set in the winding and loading apparatus 122, the process controller 128 rotates the winding shaft 147 into its initial position where the slit 155 is oriented toward the film leader 41 to accept therein.

When the film cartridge 25 is placed on the cartridge holder 145 and the film leader 41 is inserted in the slit 155, the motor 158 is driven to rotate the winding shaft 147 in a direction shown by an arrow in FIG. 15, to wind the filmstrip 28 into the roll 28a. While the winding shaft 147 is rotated to make the roll 28a, the film supply shaft 146 is disconnected from the motor 149, and rotates following the filmstrip 28. However, it is necessary to tense the filmstrip 28 to a certain degree in order to wind the filmstrip 28 so tight that the roll 28a can be accommodated in the film roll chamber 29.

In order to give an appropriate tension to the filmstrip 28, a brake mechanism 163 is coupled to the upper end of the spool 31 of the cartridge shell 26 on the cartridge holder 145, to put a brake on the film supply shaft 146. By controlling the braking force and the rotating speed of the winding shaft 147, the film roll 28a is provided with a constant diameter. As the portion of the filmstrip 28 extending between the cartridge shell 26 and the film roll 28a is also tensed to some extent during the winding process, the filmstrip 28 is slightly deformed to be like a semi-cylindrical chute, so that the emulsion surface of the filmstrip 28 does not rub against inner walls of the film unit 10 while the filmstrip 28 is advanced from the film roll chamber 29 to the cartridge chamber 27.

As the diameter of the film roll 28a on the winding shaft 147 increases, the inclination of the filmstrip 28 from the film port 49 of the cartridge shell 26 to the outermost turn of the film roll 28a increases. So as the filmstrip 28 not to rub against the inner wall of the film port 49 or the door member 51, the winding shaft 147 is located relative to the film supply shaft such that a center line of the film port 49 of the cartridge shell 26 on the film supply shaft 146 is in a tangential plane of the outer periphery of the winding shaft 147. Thereby, the filmstrip 28 would not be scratched even through the course of the filmstrip 28 from the film port 49 to the film roll 28a varies with the increasing diameter of the film roll 28a. It is alternatively useful for solving the same problem to displace the slit 155 from the rotational center of the winding shaft 147.

A photo sensor 164 is provided across the film path between the film supply shaft 146 and the winding shaft 147, to detect the perforation 48 of the filmstrip 28. Upon detection of the perforation 48, the photo senor 164 outputs a detection signal to the process controller 128, which then decelerates the motor 158. When the filmstrip 28 has been withdrawn from the cartridge shell 26 by a length corresponding to two frames since the detection of the perforation 48, the process controller 128 stops the motor 158. The length of the filmstrip 28 may be monitored by use of the pulse encoder of the film supply shaft 146.

Thereafter, the motor 149 of the film supply shaft 146 is rotated reversely to wind the filmstrip 28 back into the cartridge shell 26. The process controller 128 monitors the encoder pulses from the pulse encoder of the motor 149 and stops the motor 149 when the film supply shaft 146 comes to its initial position after the filmstrip 28 is wound a little back into the cartridge shell 26. In result, when the film roll 28a of the predetermined diameter is made, the portion of the film trailer 42 that is withdrawn from the cartridge shell 26 has a length of more than one frame.

As described above, when the film supply shaft 146 stops at the initial position, the angular position of the key groove 60 of the spool 31, which is coupled to the film supply shaft 146, corresponds to the angular position of the key projection 71 of the film winding wheel 13. The angular position of the key projection 71 is maintained constant by the winding wheel adjusting process.

In this way, by forming the film roll 28a while monitoring the advanced length of the filmstrip 28 out of the cartridge shell 26 and, thereafter, adjusting the angular position of the key groove 60 of the spool 31 to the angular position of the key projection 71 of the film winding wheel 13, the key hole 61 of the spool 31 is smoothly fit on the engaging shaft 13a of the film winding wheel 13 without fail when placing the cartridge shell 26 in the cartridge shell 27. By rotating the film supply shaft 146 reversely at the end of the winding process, the film roll 28a is prevented from uncoiling that would be caused as the roll of the filmstrip 28 on the spool 31 is unwound.

It is alternatively possible to detect the angular position of the engaging shaft 13a of the film winding wheel 13 by an image recognition device or the like, and adjust the angular position of the film supply shaft 146 and thus the angular position of the spool 31 to the angular position of the engaging shaft 13a. According to this alternative embodiment, the winding wheel adjusting process may be omitted.

Furthermore, the distance of the winding shaft 147 from the cartridge holder 145 is changed according to the type of the film unit 10, i.e., depending upon whether the film cartridge 25 is to be loaded in a flash built-in type film unit or not. For this purpose, a cylinder 166 is driven by the process controller 128 to move a base plate 165 holding the motor 158 in the film lengthwise direction. As the base plate 165 is coupled to a base plate 167 holding the winding shaft 147 through a pin 165a that is formed on the base plate 165, the base plate 167 of the winding shaft 147 is moved along with the base plate 165.

A film loading mechanism of the winding and loading apparatus 122 consists of a first turning device 170 for turning both the film supply shaft 146 and the winding shaft 147 about an axle 168 into a horizontal state, a second turning device 170 for turning the winding shaft 147 about the film supply shaft 146, and a sliding device 172 for sliding the shafts 146 and 147 toward the turn table 115.

Figure 16:
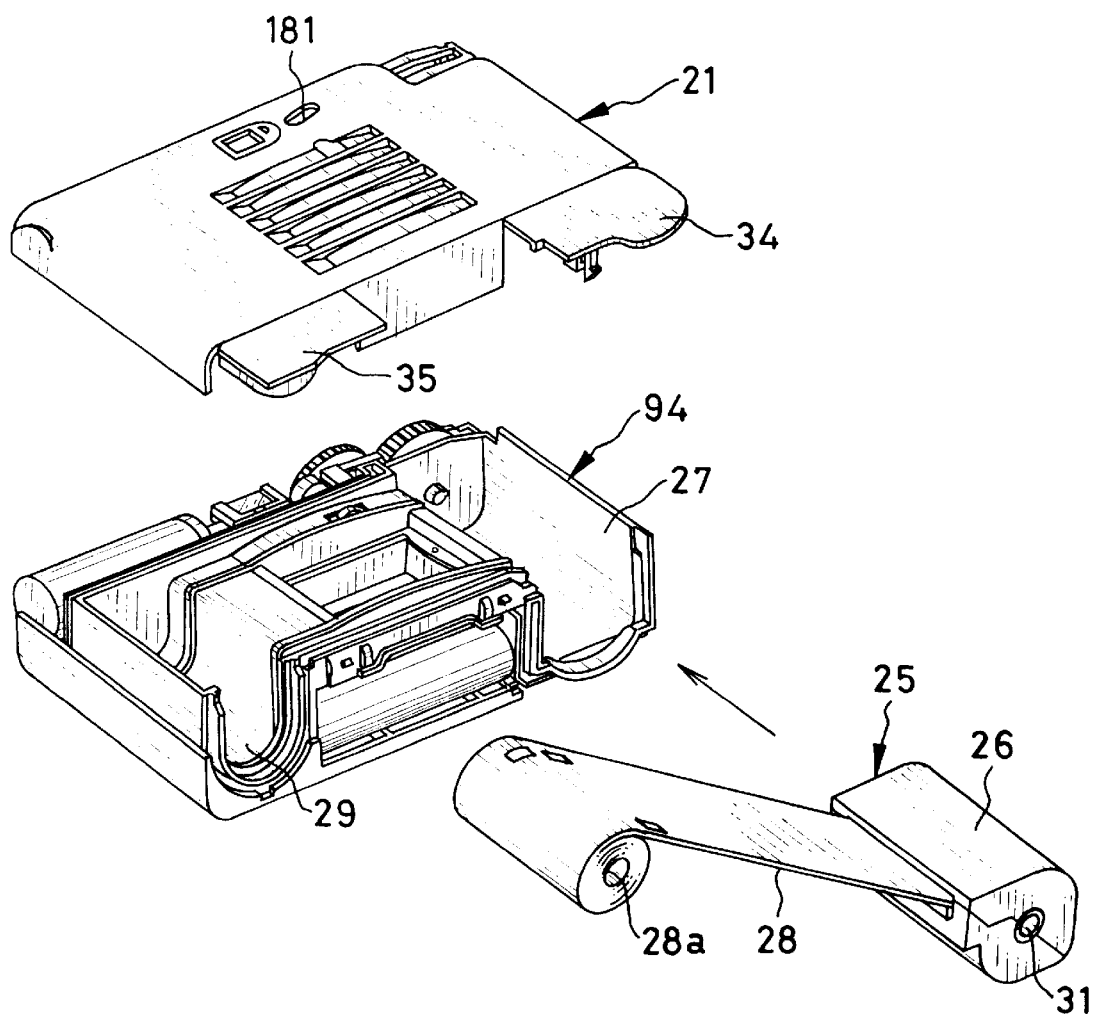
FIG. 16 is an explanatory diagram illustrating the loading process of the film cartridge in the unit body.

The process controller 128 drives the first and second turning devices 170 and 171 concurrently after the completion of forming the film roll 28a. As the first turning device 170 is driven, the axle 168 rotates to turn the film supply shaft 146 and the winding shaft 147 into the horizontal state. At that time, the joint member 157 of the winding shaft 147 is disconnected. As the second turning device 171 is driven, the winding shaft 147 is rotated upward about the film supply shaft 146, bringing the film roll 28a and the cartridge shell 26 into a position as shown in FIG. 16. Thereafter, the sliding device 172 is driven to move the cartridge shell 26 and the film roll 28 in the axial direction of the spool 31, to insert the cartridge shell 26 into the cartridge chamber 27 from the bottom side thereof. Since the main body 94 is placed on the pallet 117 with its backside up, the film roll 28a is moved to a position above the film roll chamber 29 of the main body 94. After the spool 31 is engaged with the engaging shaft 13a of the film winding wheel 13, the second turning device 171 is driven in the opposite direction, to rotate the winding shaft 147 downward about the film supply shaft 146. Thereby, the film roll 28a is put in the film roll chamber 29 from upward.

After the cartridge shell 26 and the film roll 28a are loaded in the main body 94, the rear cover 21 placed on the pallet 116 is attached to the back of the main body 94. Thereafter, the winding shaft 147 and the film supply shaft 146 are pulled out of the main body 94 by driving the sliding device 172 in the opposite direction. The rear cover 21 has stopping members 173 and 174 on its inner wall portions near the bottom lids 34 and 35, as shown in FIG. 2. Because of the stopping members 173 and 174, the cartridge shell 26 and the film roll 28a are held in the chambers 27 and 29 even while the shafts 146 and 147 are pulled out of the main body 94.

The unit body 10, which is provided by attaching the rear cover 21 to the main body 94, is fed to a bottom lid closing process by the stepwise rotation of the turn table 115, as shown in FIG. 13. In the bottom lid closing process, the bottom lids 34 and 35 are closed. As the bottom lid 34 is closed, the hook 65 of the bottom lid 34 is brought into engagement with the lower end 64b of the interconnection rod 64. Thereafter the unit body 11 is fed to a taking off process, wherein the unit body 11 is taken off the turn table 115, and is put out of the dark room 93a through the exit. Then, the unit body 11 is sent to an exclusion process.

An infrared camera 175 is provided for monitoring the inside of the dark room 83. Image data from the infrared camera 175 is sent to a disorder detector 177 through an image processor 176. The disorder detector 177 compares the image data to reference image data with respect to brightness values, to check if the indication lamp 37 or the light emitting portion 38 accidentally emits light. If the indication lamp 37 or the light emitting portion 38 emits light inside the dark room 83, the filmstrip 28 is unexpectedly exposed. In that case, the disorder detector 177 outputs an NG (no good) signal to the controller 178, so all of the main bodies 94 and the unit bodies 11 that exist inside the dark room 83 at the time of exposure are disqualified and excluded at the exclusion process.

After passing the exclusion process, the unit body 11 goes through a winding wheel inspection process, a shutter and flash inspection process, and an appearance inspection process, before being fed to a packing process.

In the winding wheel inspection, the torque of the film winding wheel 13 is measured while rotating the film winding wheel 13 in the winding direction, to check if the film winding wheel can wind the filmstrip 28 by a given torque. When the filmstrip 28 has been wound up by one frame amount in the winding wheel inspection, the locking lever 75 and the locking cam 77 stop the film winding wheel 13 from rotating. Also the shutter drive lever 74 is rotated to the charged position. Meanwhile the flash charge button 15 is pushed to charge the flash unit 24 for the flash inspection. Thereafter, the shutter release button 16 is depressed to check if the light emitting portion 38 emits light synchronously with the shutter releasing. For the flash inspection, a photo receiving element is disposed in front of the light emitting portion 38. Needless to say, the flash inspection is not carried out on those types of film unit which do not have a flash unit.

For the shutter inspection, a reflective photo sensor is placed in front of the taking lens 18, which projects light toward the shutter blade 72 through the taking lens 18, and receives light reflected from the shutter blade 72. Based on the received light, it is checked if the shutter blade 72 opens and closes in response to the shutter releasing.

Since the filmstrip 28 is wound up by one frame amount in the winding wheel inspection, the length of the film trailer 42 that remains out of the cartridge shell 26 becomes to be correspondent to one frame at the end of the winding wheel inspection. Therefore, the next film winding operation will set the frame recording area 43 behind the exposure aperture 30a.

The unit body 11 passing through the winding wheel inspection and the shutter and flash inspection is subjected to the appearance inspection, and then wrapped with the wrapping member 12 in the packing process. The slot 181 of the rear cover 21 is closed by the wrapping member 12. If the unit body 11 is disqualified in any of the above unit body inspection processes, the unit body 11 is excluded at that inspection process.

The present invention has been described with respect to the embodiment shown in the drawings, the present invention should not be limited to the above described embodiment but, on the contrary, various modification may be possible to those skilled in the art without departing from the scope of claims attached hereto.

What is claimed is:

1. A film unit manufacturing apparatus for manufacturing a film unit having a cartridge chamber and a film roll chamber which hold a cartridge shell and a roll of photo filmstrip respectively, wherein the cartridge shell contains an entire length of the filmstrip before being exposed, and is able to advance the filmstrip out of the cartridge shell by rotating a spool of the cartridge shell in an unwinding direction, the apparatus comprising:

a film leader advancing device comprising a spool drive shaft and a film leading end detection device for detecting the leading end of the filmstrip, the film leader advancing device advancing the filmstrip out of the cartridge shell by rotating the spool through the spool drive shaft and stopping the spool drive shaft when the film leading end detection device detects the leading end of the filmstrip at a predetermined position out of the cartridge shell;

a rotational position detecting device for detecting a rotational position of the spool at the stop of the spool drive shaft based on a rotational position of the spool drive shaft;

a winding device having a film supply shaft to engage the spool of the cartridge shell therewith and a winding shaft to engage the leading end of the filmstrip therewith, the winding device withdrawing the filmstrip from the cartridge shell and winding the filmstrip into a roll by rotating the winding shaft;

an adjusting device for adjusting a rotational position of the film supply shaft to the rotational position of the spool that is detected by the rotational position detecting device, before the spool is disengaged from the spool drive shaft and is engaged with the film supply shaft; and a loading device for loading the roll of the filmstrip and the cartridge shell in the film roll chamber and the cartridge chamber of the film unit respectively.

2. A film unit manufacturing apparatus according to claim 1, further comprising a device for detecting a predetermined trailing end point of the filmstrip to stop the winding shaft at a timing determined with reference to the trailing end point, wherein the device for adjusting the rotational position of the film supply shaft adjusts the rotational position of the film supply shaft to a predetermined rotational position of a film winding wheel of the film unit after the stop of the winding shaft, the film winding wheel being engaged with the spool of the cartridge shell when the cartridge shell is loaded in the cartridge chamber.

3. A film unit manufacturing apparatus according to claim 1, wherein the spool drive shaft has a key projection that is to be engaged in a key groove of the spool of the cartridge shell, and the rotational position detecting device detects an angular position of the key projection.

4. A film unit manufacturing apparatus according to claim 1, wherein the film leading end detection device comprises at least two photo sensors which are arranged along a film advancing path, wherein the speed of rotating the spool drive shaft is decelerated when the first photo sensor in the order from upstream of the film advancing path detects the leading end of the filmstrip, and the spool drive shaft is stopped when the second photo sensor detects the leading end of the filmstrip.

5. A film unit manufacturing apparatus according to claim 1, wherein the film leader advancing device further comprises a device for adjusting the length of the filmstrip to be advanced out of the cartridge shell according to a spacing between the film roll chamber and the cartridge chamber.

6. A film unit manufacturing apparatus according to claim 5, wherein the winding device further comprises a device for adjusting distance from the film supply shaft to the winding shaft according to a spacing between the film roll chamber and the cartridge chamber.

* * * * *